United States Patent [19]

Stuck

[11] Patent Number: 4,716,820
[45] Date of Patent: Jan. 5, 1988

[54] BAKED GOODS COOKING APPARATUS

[76] Inventor: Robert M. Stuck, 1 Thornwood Rd., Clover, S.C. 29710

[21] Appl. No.: 264,113

[22] Filed: May 15, 1981

[51] Int. Cl.[4] .............................................. A23L 3/00
[52] U.S. Cl. ..................................... 99/443 C; 99/391
[58] Field of Search ................. 99/386, 389, 391, 401, 99/443 C, 447; 126/21 A, 41 C; 432/152, 176; 219/388

[56] References Cited

U.S. PATENT DOCUMENTS

| | | | |
|---|---|---|---|
| 1,949,716 | 3/1934 | Harsch | 432/152 X |
| 3,580,164 | 5/1971 | Baker | 99/391 X |
| 3,802,832 | 4/1974 | Nicolaus | 99/443 C |
| 3,947,241 | 3/1976 | Caridis | 99/443 C |
| 4,188,868 | 2/1980 | Baker | 99/401 X |
| 4,208,441 | 6/1980 | Westover | 99/386 X |

FOREIGN PATENT DOCUMENTS

| | | | |
|---|---|---|---|
| 171504 | 11/1951 | Austria | 99/443 C |
| 2045593 | 11/1980 | United Kingdom | 99/386 |

*Primary Examiner*—Robert W. Jenkins
*Attorney, Agent, or Firm*—Daniel E. McConnell

[57] ABSTRACT

A cooking apparatus and method, particularly for baked goods foodstuffs such as pizza and the like, in which a foodstuff conveyor extends through a cooking zone defined within a housing. The cooking zone is heated by heat sources emitting infrared radiation and convectively heating air. More uniform cooking is accomplished by tempering the effect of the heat sources by interrupting reflection of infrared radiation and agitating air.

8 Claims, 3 Drawing Figures

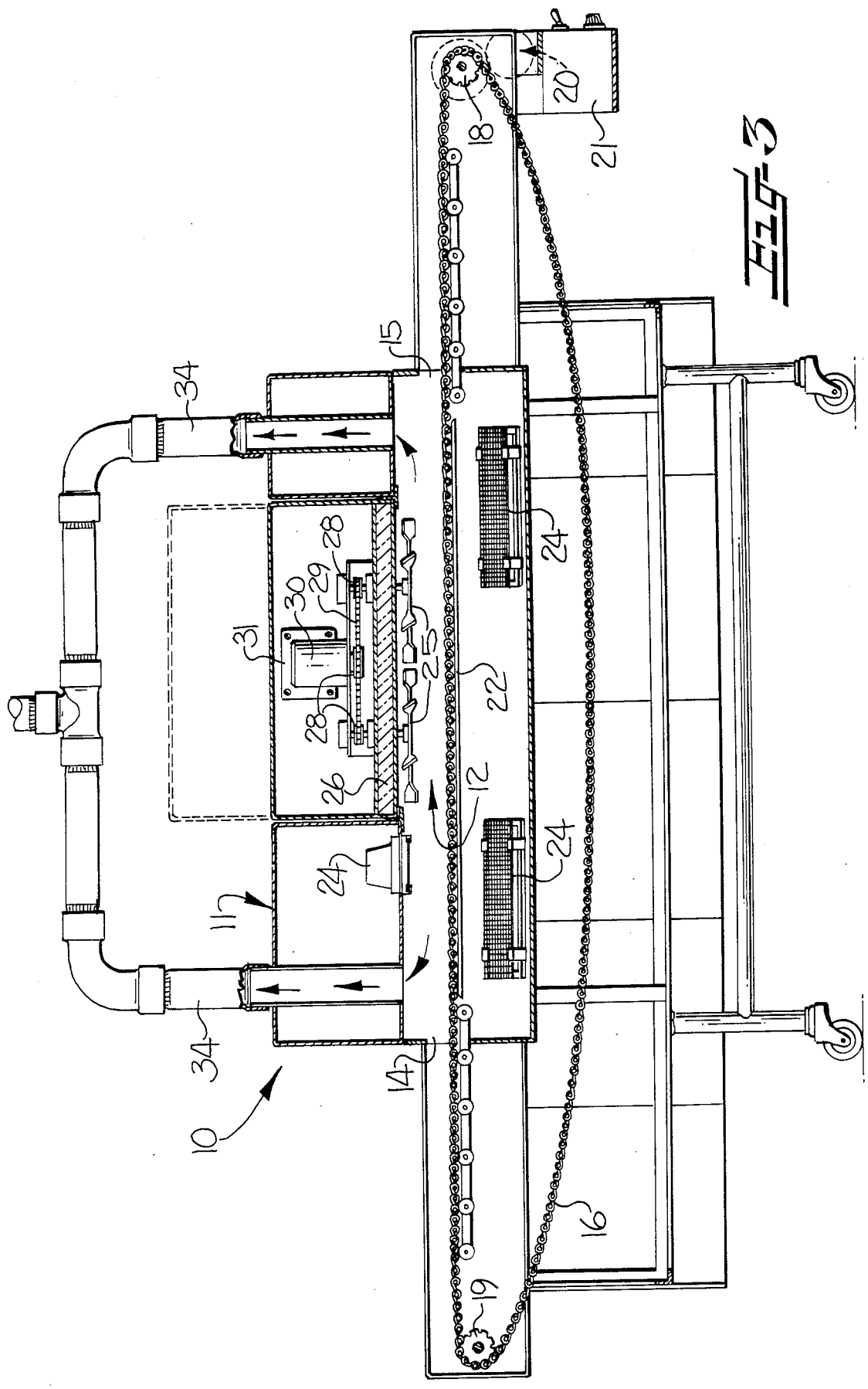

BAKED GOODS COOKING APPARATUS

FIELD AND BACKGROUND OF THE INVENTION

It has been proposed heretofore that foodstuffs be cooked through the use of apparatus and in accordance with methods in which conveyors move foodstuffs through cooking apparatus. Particularly with regard to certain foodstuffs, such apparatus and methods have achieved some recognition and success.

With certain types of baked goods foodstuffs, it is important to the quality of the goods produced that cooking or baking be essentially uniform. By way of example, if a relatively great number of items such as rolls, buns, biscuits or the like are to be baked using a cooking apparatus of the general type described, it is important that the baked goods be uniformly cooked in order that a uniform quality be attained. Comparable requirements exist where the cooking involved combines baking and other cooking processes, such as in preparing pizza and the like where successive individual items having both a crust and fillings or coverings must be heated.

Where fillings or coverings are involved such as with pizza, there is an increased likelihood that the covering or filling materials will, during the cooking process, bubble over or melt into the apparatus used. Thus, it is important that provision be made for adequate maintenance and cleaning of the apparatus employed.

BRIEF DESCRIPTION OF INVENTION

With the foregoing in mind, it is an object of the present invention to provide a cooking apparatus of the type generally described which achieves more uniform cooking of foodstuff conveyed through a cooking zone. In realizing this object of the present invention, a cooking zone defined within an enclosing housing and through which foodstuff is moved by a conveyor is heated by the emission of infrared radiant energy and by convective heating of air. Further, the heating of the cooking zone and of foodstuff moving therethrough is tempered by interruption of reflection of infrared radiation from the heating means and by agitation of air in the cooking zone. By such tempering, more uniform cooking of foodstuff conveyed through the cooking zone is accomplished.

Yet a further object of the present invention is to cook foodstuffs of the types described in accordance with a method in which foodstuff being cooked is conveyed through a cooking zone by an endless conveyor while the cooking zone is heated by the emission of infrared radiant energy and by convective heating of air. In accordance with the method of the present invention, more uniform cooking of foodstuffs being cooked in accordance with such methods is achieved by tempering the heating which is accomplished by agitating air in the cooking zone while interrupting the reflection of infrared radiation. The agitating and interrupting are accomplished at a controlled variable rate as required for uniformity in cooking of the particular food products being handled.

BRIEF DESCRIPTION OF DRAWINGS

Some of the objects of the invention having been stated, other objects will appear as the description proceeds, when taken in connection with the accompanying drawings, in which

FIG. 3 is a view similar to FIG. 2, taken generally along the line 3—3 in FIG. 1.

DETAILED DESCRIPTION OF INVENTION

While the present invention will be described more particularly hereinafter with reference to the accompanying drawings, in which a preferred embodiment for the invention is shown, it is to be understood at the outset of the description which follows that this invention may be modified while still achieving the benefits and advantages to be described. Accordingly, the description which follows is to be understood as a broad, teaching disclosure directed to persons of skill in the relevant arts, and not as limiting upon the scope of this invention.

Figure 1:
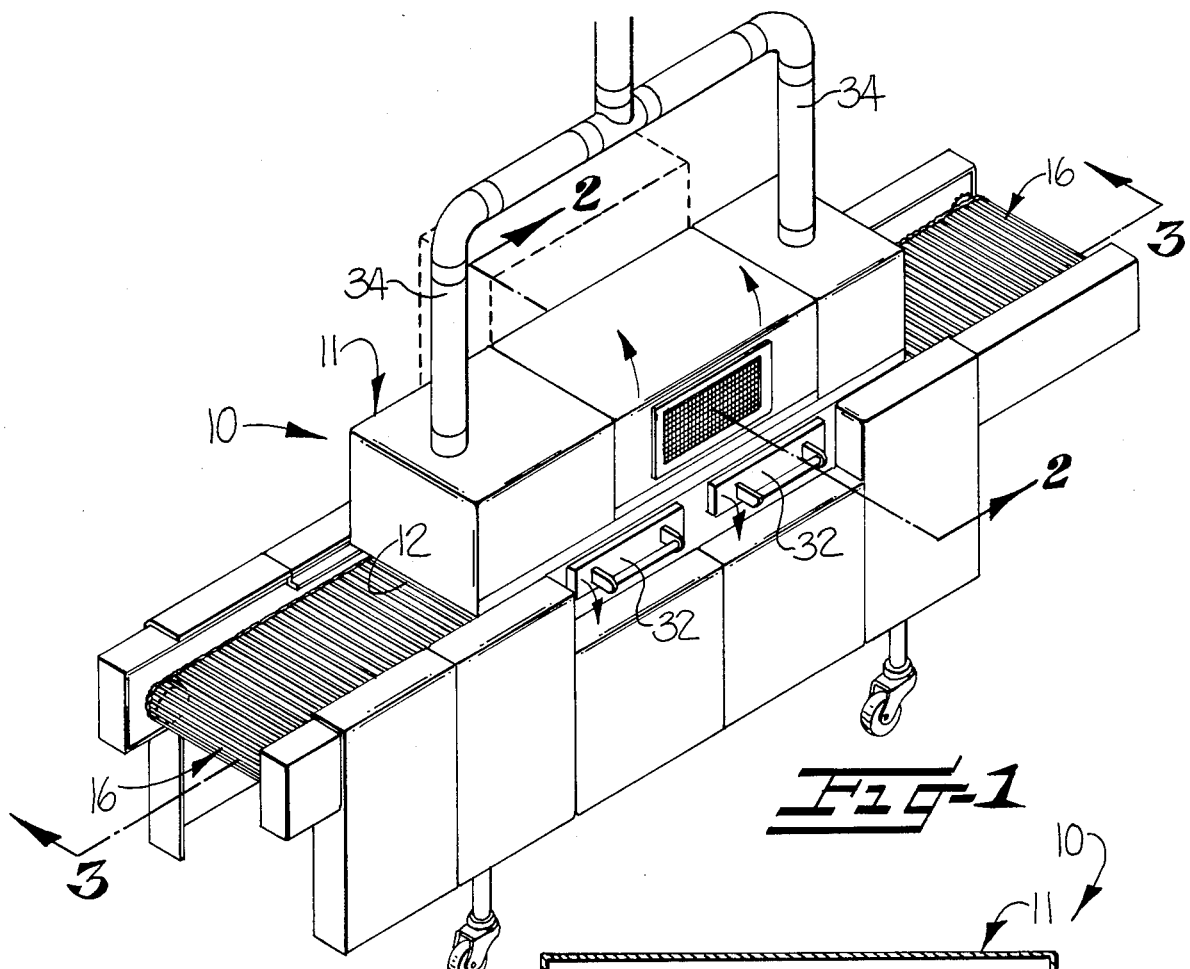
FIG. 1 is a perspective view of an apparatus in accordance with the present invention.
Figure 2:
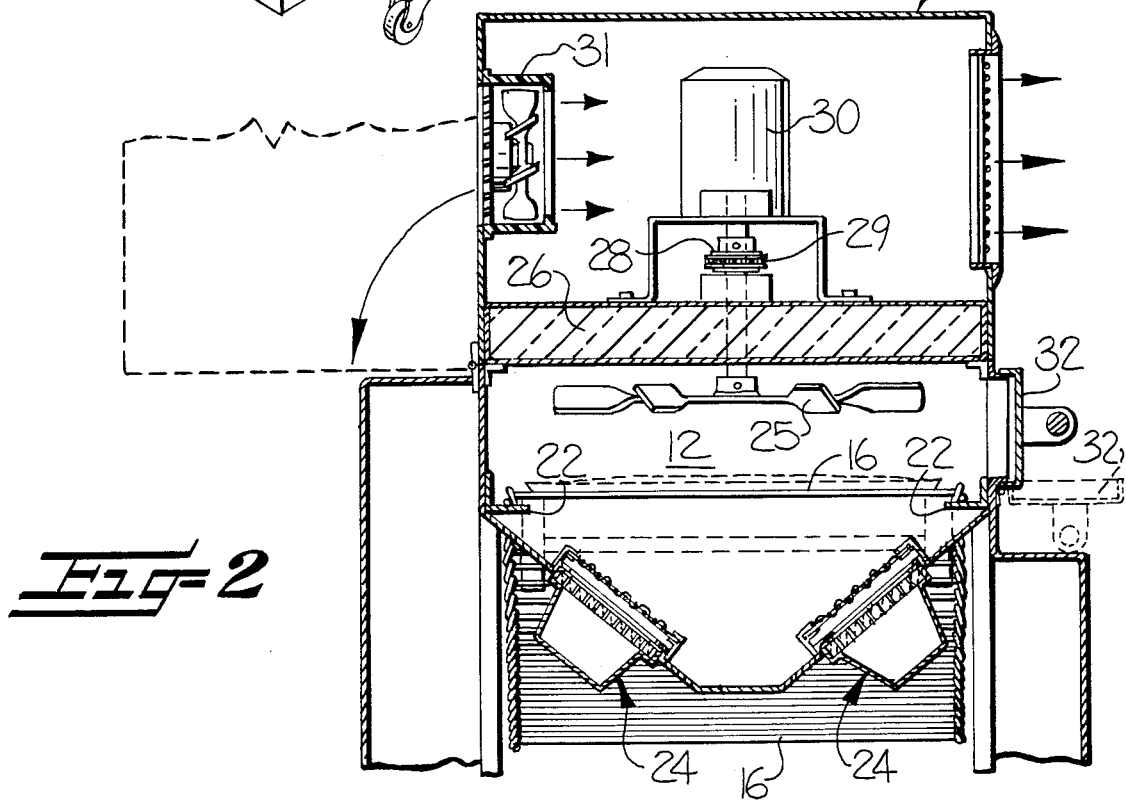
FIG. 2 is an elevation view, in section, through a portion of the apparatus of FIG. 1 and taken generally as indicated along the line 2—2 in that Figure.

An apparatus in accordance with the present invention is illustrated in FIGS. 1 through 3 and is generally indicated at 10. As will be described in greater detail hereinafter, the apparatus 10 includes a housing means generally indicated at 11 for enclosing a cooking zone 12. The cooking zone 12 generally has the configuration of a "tunnel" having an entry end 14 and an exit end 15. An endless foodstuff conveyor means generally indicated at 16 is mounted to extend through the cooking zone 12 and for movement along a closed path of travel having upper and lower runs (FIG. 3). Preferably, the conveyor means 16 is an open bar chain conveyor of wire formed links trained about a drive sprocket 18 and an idle sprocket 19. The drive sprocket 18 is driven by an appropriate variable speed drive assembly generally indicated at 20 (FIG. 3) and which typically includes an electrical motor as a prime mover, a motor speed control having a speed variation control element 21 such as a potentiometer, and coupled to the drive sprocket 18 through an appropriate gear train. The upper run of the conveyor means 16 is supported as and where appropriate to facilitate the conveyor means supporting foodstuffs and pans or the like containing the foodstuffs as the foodstuffs move through the cooking zone 12. In the form illustrated, support for the conveyor means 16 within the cooking zone 12 may include angle iron lip members 22 (FIG. 2) underlying the lengthwise margins of the conveyor 16.

Heating means are mounted in the housing means 11 for heating the cooking zone 12. In the particular form illustrated, the heating means takes the form of a plurality of heat sources generally indicated at 24 (FIGS. 2 and 3) for directing infrared radiation toward foodstuff supported on and moving with the conveyor means 16 while heating air within the cooking zone 12 by convection. In the arrangement illustrated, one heat source is mounted above and transversely of the "tunnel" cooking zone 12 near the entry opening 14, while four heat sources 24 are located below the upper run of the conveyor 16 and spaced along the length of the cooking zone 12 (FIGS. 2 and 3). The heat sources illustrated are in the form of burners for gaseous fuel such as natural gas and are of a general type known as face burners in which a mixture of fuel and air is delivered through a large number of small orifices in a block of ceramic-like material for burning at the surface or face of the blocks.

The flame faces of the heat sources 24 preferably are covered by a protective screen of metal wire, metal mesh or the like. As a consequence, heating of the cooking zone 12 occurs both by emission of infrared radiation and by convective heating of air within the housing 11. The placement of the heat sources in the embodiment illustrated is such as to direct infrared radiant energy downwardly onto the upper surface of foodstuff being cooked and upwardly through the conveyor against any pan or the like containing the foodstuff. In part as a consequence of the arrangement of the heat sources, foodstuffs are cooked both from above and from below by the types of heating described. Persons of appropriate skill in the arts of applying heating sources to cooking apparatus will recognize the applicability of alternative types of heat sources which both emit infrared radiant energy and accomplish convective heating of air. Such persons will also recognize the possibility of modifying the specific arrangement of heat sources illustrated where appropriate to achieving the operations here described.

In accordance with the present invention, tempering means are provided so as to facilitate more uniform cooking of foodstuff conveyed through the cooking zone 12 along the upper run of the conveyor 16. The tempering means, in this invention, accomplishes the multiple functions of agitating air in the cooking zone 12 while interrupting reflection of infrared radiation from the heat sources 24. In the specific form illustrated, the tempering means comprises fan means 25 having impeller blades mounted within the cooking zone 12 for rotation. The impeller blades preferably are elongate strips of metal, bent or twisted so as to stir air and effective for mechanically "chopping" or stroboscopically interrupting reflected infrared radiation within the cooking zone. The fan means 25 have shafts penetrating an appropriate body of thermal insulation 26 and, adjacent their upper ends, being provided with driven pulleys 28 engaged by a drive belt 29. The drive belt 29 also engages, and is driven by, a suitable motive means such as an electrical motor 30. The speed of the electrical motor 30 may be controllably varied, so as to drive the fan means 25 over a range of desirable rotational speeds, as from about 40 revolutions per minute to about 200 revolutions per minute. Experimentation with an operating embodiment of the invention as here described has discovered that the uniformity of cooking of foodstuffs conveyed through the apparatus of the present invention is varied by selecting speeds within those ranges and that a desired uniformity will be achieved at some point within that range.

While the interaction between air agitation and infrared radiation reflectivity interruption is not fully understood, it is to be appreciated by persons skilled in the appropriate arts that the relationship is not necessarily linear. That is, while the tempering means accomplishes both functions, variations in cooking resulting from variations in air agitation are not necessarily linearly related to variations in cooking resulting from variations in infrared radiation reflection interruption. Experience strongly suggests that selection of a final rotational speed for the fan means 25 of the tempering means be done empirically, through testing of the specific food products to be cooked in the apparatus and in accordance with the methods of this invention.

The motor 30 through which the fan means 25 are driven preferably is cooled by an air flow through the central portion of the housing means 11 which contains the motor. Such an air flow is provided by a cooling fan generally indicated at 31.

Access to the cooking zone 12 and the other portions of the apparatus 10 may be desired for varying purposes. For example, the apparatus 10 may be employed in some kitchens wherein more than one type of product is prepared using the apparatus, and the cooking time for the various products is different. By means of side doors 32 (FIGS. 1 and 2), foodstuffs may be introduced into the cooking zone 12 at an intermediate point along the length of the cooking zone and thus may be subjected to reduced times of cooking. Further, the central portion of the housing means 11, containing the tempering means, preferably is hinged for lifting away from the cooking zone 12 (to the phantom line position in FIGS. 1 through 3). With the central portion of the housing means 11 removed, the interior of the apparatus 10 is accessible for cleaning and maintenance such as the removal of cheese or the like or the replacement of components.

As will be noted, the cooking zone 12 is vented through a pair of flues 34 which, in the installation illustrated, join together into a single flue. Where appropriate, the flues 34 may be relatively short stacks terminating within or beneath a canopy hood which would provide for ventilation of the area ambient to the apparatus 10.

The apparatus 10 is supported upon a suitable structural framework, preferably having casters so as to permit movement of the apparatus 10 to whatever location is necessary or appropriate for use.

In practicing the method of cooking foodstuffs in accordance with the present invention, and as particularly exemplified by cooking pizza, the apparatus 10 is positioned as is appropriate in the kitchen of a restaurant offering pizza, preferably with that portion of the conveyor means 16 leading into the entrance 14 to the cooking zone 12 adjacent a food preparation table or area in which pizzas are assembled. As orders for pizza are received and individual pizzas are prepared, pans bearing the assembled pizzas are placed on the conveyor means 16 adjacent the entry 14 and are moved into the cooking zone 12 with movement of the conveyor 16. Movement of the conveyor 16 is under the control of an operator stationed adjacent the exit 15 from the cooking zone 12 and having access to the speed control 21 and an on-off switch for the conveyor drive. As a prepared pizza is conveyed through the cooking zone 12 (as indicated in phantom lines in FIG. 2), the upper surface of the pizza is subjected to heat from the transverse upper heat source 24 which spans the width of the conveyor 16. The pan is subjected to infrared radiation from the four heat sources 24 disposed beneath the upper run of the conveyor 16. Additionally, and particularly in passing beneath the tempering means, air heated by convection by the heat sources 24 is agitated above and about the foodstuff while infrared radiant energy reflected within the cooking zone 12 from the heat sources 24 is dispersed by interruption of patterns of reflection by the tempering means. Typically, movement of a pizza from the loading area adjacent the entry 14 to the unloading area adjacent the exit 15 occupies approximately eight minutes time.

In the drawings and specification, there has been set forth a preferred embodiment of the invention, and although specific terms are employed, they are used in a generic and descriptive sense only and not for purposes of limitation.

That which is claimed is:

1. A cooking apparatus comprising:
   housing means for enclosing a cooking zone,
   endless foodstuff chain conveyor means mounted to extend through said cooking zone and for movement along a closed path of travel having upper and lower runs,
   heating means mounted in said housing means for heating said cooking zone by emission of infrared radiation and by convective heating of air and for cooking foodstuff conveyed therethrough along said upper run of said conveyor means, and
   tempering means mounted in said housing means and extending into said cooking zone for stroboscopically interrupting reflection within said housing means of infrared radiation from said heating means and for agitating air in said cooking zone so as to facilitate more uniform cooking of foodstuff conveyed through said cooking zone along said upper run of said conveyor means.

2. Apparatus according to claim 1 wherein said heating means comprises a plurality of heat sources mounted beneath said conveyor means and within said cooking zone for directing infrared radiation toward foodstuff supported on and moving with said conveyor means while heating air within said cooking zone by convection.

3. Apparatus according to one of claims 1 or 2 wherein said heating means comprises at least one heat source mounted above said conveyor means and within said cooking zone for directing infrared radiation downwardly toward the upper surface of foodstuff supported on and moving with said conveyor means while heating air within said cooking zone by convection.

4. Apparatus according to claim 1 wherein said heating means comprises a plurality of fluid fuel burner heat sources mounted above and below said conveyor means and within said cooking zone for directing infrared radiation downwardly and upwardly toward foodstuff supported on and moving with said conveyor means while heating air within said cooking zone by convection.

5. Apparatus according to claim 1 wherein said tempering means comprises fan means having impeller blades mounted within said cooking zone for rotation, and drive means for rotating said fan means.

6. Apparatus according to claim 5 wherein said drive means for rotating said fan means comprises an electrical motor and control circuit means electrically connected with said electrical motor for varying the speed of rotation of said fan means.

7. Apparatus according to claim 6 wherein said control circuit means accomplishes variation in the rotational speed of said fan means in a range of from about forty (40) revolutions per minute to about two hundred (200) revolutions per minute.

8. Apparatus for cooking baked goods such as pizza and the like and comprising:
   housing means for enclosing a cooking zone,
   conveyor means mounted in said housing means for extending through said cooking zone and for moving foodstuff through said cooking zone,
   a plurality of heat source means mounted in said housing means above and below said conveyor means and within said cooking zone for directing infrared radiation downwardly and upwardly toward foodstuff supported on said conveyor means and moved thereby through said cooking zone, said heat source means also heating air within said cooking zone by convection, and
   tempering means effective for facilitating more uniform cooking of foodstuff conveyed through said cooking zone and comprising fan means having impeller blades mounted for rotation within said cooking zone, and variable speed drive means for rotating said fan means for agitating air in said cooking zone while interrupting reflection of infrared radiation from said heating means.

* * * * *